(12) United States Patent
Ishibashi et al.

(10) Patent No.: US 12,397,666 B2
(45) Date of Patent: Aug. 26, 2025

(54) ELECTRIC VEHICLE

(71) Applicant: TOYOTA JIDOSHA KABUSHIKI KAISHA, Toyota (JP)

(72) Inventors: Masayuki Ishibashi, Numazu (JP); Hiroki Kunifuda, Chiryu (JP); Hyuksoo Kwon, Anjo (JP); Shinichiro Suenaga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/441,281

(22) Filed: Feb. 14, 2024

(65) Prior Publication Data
US 2024/0300349 A1    Sep. 12, 2024

(30) Foreign Application Priority Data

Mar. 8, 2023  (JP) ................. 2023-036069

(51) Int. Cl.
*B60L 15/00*    (2006.01)
*B60L 15/20*    (2006.01)
(Continued)

(52) U.S. Cl.
CPC .......... *B60L 53/22* (2019.02); *B60L 15/2036* (2013.01); *B60L 50/61* (2019.02); *B60L 53/24* (2019.02); *B60L 15/007* (2013.01); *B60L 50/15* (2019.02); *B60L 2210/10* (2013.01); *B60L 2220/42* (2013.01)

(58) Field of Classification Search
CPC ...... B60L 53/22; B60L 15/2036; B60L 50/61; B60L 53/24; B60L 15/007; B60L 50/15; B60L 2210/10; B60L 2220/42; Y02T 10/62; Y02T 10/64; Y02T 10/70; B60K 6/445; B60K 6/40; B60K 1/02; B60K 6/405; B60K 6/365; F16H 2037/0873; F16H 3/728
USPC ..... 701/22; 180/65.285, 65.265, 65.1, 65.29, 180/65.235; 318/139; 307/10.1, 9.1; 320/109
See application file for complete search history.

(56) References Cited

U.S. PATENT DOCUMENTS

| | | | |
|---|---|---|---|
| 8,905,881 B2 * | 12/2014 | Sada .............. | B60K 6/445 475/5 |
| 2023/0163654 A1 * | 5/2023 | Asakura .......... | B62D 21/152 310/71 |

FOREIGN PATENT DOCUMENTS

JP     2021-046003 A    3/2021

* cited by examiner

Primary Examiner — Elim Ortiz
(74) Attorney, Agent, or Firm — Oliff PLC

(57) ABSTRACT

An electric vehicle includes a mechanical-electrical integrated unit constituted by a drive apparatus and an electric-power control apparatus that are housed in a same casing. The drive apparatus includes a first electric motor, a second electric motor and a transmission device. The electric-power control apparatus is configured to control an electric power transmitted and received by the first and second electric motors. The electric-power control apparatus and the drive apparatus are housed in upper and lower casing portion of the casing, respectively. The second electric motor includes a stator core that is provided with a plurality of fastened portions, such that one of the plurality of fastened portions is disposed in a position which overlaps the upper casing portion in a vertical direction of the vehicle and which is located on a front side of an axis of the second electric motor in a longitudinal direction of the vehicle.

8 Claims, 5 Drawing Sheets

(51) Int. Cl.
*B60L 50/15* (2019.01)
*B60L 50/61* (2019.01)
*B60L 53/22* (2019.01)
*B60L 53/24* (2019.01)

ELECTRIC VEHICLE

This application claims priority from Japanese Patent Application No. 2023-036069 filed on Mar. 8, 2023, the disclosure of which is herein incorporated by reference in its entirety.

FIELD OF THE INVENTION

The present invention relates to an electric vehicle provided with a mechanical-electrical integrated unit that is constituted by a drive apparatus and an electric-power control apparatus that are housed in a same casing, wherein the drive apparatus includes a first electric motor, a second electric motor and a transmission device, while the electric-power control apparatus is configured to control an electric power transmitted and received by the first and second electric motors.

BACKGROUND OF THE INVENTION

There is known a vehicle in which a drive apparatus and an electric-power control apparatus are housed in respective casings that are separated from each other, wherein the drive apparatus includes a first electric motor, a second electric motor and a transmission device, while the electric-power control apparatus includes an inverter configured to control an electric power transmitted and received by the first and second electric motors, and wherein the casing housing the electric-power control apparatus is disposed above the casing housing the drive apparatus. A vehicle disclosed in JP 2021-46003 A is an example of such a vehicle.

SUMMARY OF THE INVENTION

By the way, in order to simplify shape of a drive unit, it might be possible to employ an arrangement in which the drive apparatus and the electric-power control apparatus are housed in a same casing, that is, to form a mechanical-electrical integrated unit, for example, such that the electric-power control apparatus is housed in an upper casing portion of the casing while the drive apparatus is housed in a lower casing portion of the casing. In this arrangement, the above-identified Japanese Patent Application Publication does not particularly specify fastened positions in which a stator core of the electric motor of the drive apparatus is fastened to the casing. Depending on the fastened positions of the stator core of the electric motor, size reduction of the mechanical-electrical integrated unit is suppressed.

The present invention was made in view of the background art described above. It is therefore an object of the present invention to provide an electric vehicle in which size of a mechanical-electrical integrated unit can be reduced.

The object indicated above is achieved according to the following aspects of the present invention.

According to a first aspect of the invention, there is provided an electric vehicle including: a pair of drive wheels; and a mechanical-electrical integrated unit constituted by a drive apparatus and an electric-power control apparatus that are housed in a same casing, wherein the drive apparatus includes a first electric motor, a second electric motor and a transmission device configured to transmit a power outputted by the second electric motor toward the drive wheels, wherein the electric-power control apparatus is configured to control an electric power transmitted and received by the first and second electric motors. In the electric vehicle, (a) the casing has an upper casing portion and a lower casing portion that is disposed on a lower side of the upper casing portion in a vertical direction of the electric vehicle, (b) the electric-power control apparatus is housed in the upper casing portion while the drive apparatus is housed in the lower casing portion, (c) the first electric motor, the second electric motor and the transmission device have respective axes all of which are parallel to a width direction of the electric vehicle, (d) the axis of the second electric motor, the axis of the transmission device and the axis of the first electric motor are arranged in this order from above to below in the vertical direction, (e) the axis of the first electric motor, the axis of the transmission device and the axis of the second electric motor are arranged in this order from front to rear in a longitudinal direction of the electric vehicle, (f) the second electric motor includes a stator core that is provided with a plurality of fastened portions such that a first fastened portion as one of the plurality of fastened portions is disposed in a position which overlaps the upper casing portion in the vertical direction and which is located on a front side of the axis of the second electric motor in the longitudinal direction, and (g) another one of the plurality of fastened portions is disposed in a position which does not overlap the upper casing portion in a circumferential direction of the stator core. The second electric motor is fastened at the plurality of fastened portions to the lower casing portion of the casing, for example.

According to a second aspect of the invention, in the electric vehicle according to the first aspect of the invention, the first fastened portion is disposed in the position which is not higher than an uppermost portion of a yoke of the stator core in the vertical direction and which is not more front than a frontmost portion of the yoke of the stator core in the longitudinal direction.

According to a third aspect of the invention, in the electric vehicle according to the first or second aspect of the invention, the electric vehicle includes: a differential gear device to which the power is to be transmitted through the transmission device, and a drive shaft connecting between the differential gear device and each of the drive wheels, wherein a second fastened portion as the another one of the plurality of fastened portions is disposed in the position which is lower than the axis of the transmission device in the vertical direction and which is located on an outer peripheral side of the drive shaft.

According to a fourth aspect of the invention, in the electric vehicle according to any one of the first through third aspects of the invention, a third fastened portion as still another one of the plurality of fastened portions is disposed in a position that does not overlap the axis of the second electric motor in the vertical direction.

According to a fifth aspect of the invention, in the electric vehicle according to any one of the first through third aspects of the invention, a third fastened portion as still another one of the plurality of fastened portions is disposed in a position that is higher than a pedal of the electric vehicle in the vertical direction.

According to a sixth aspect of the invention, in the electric vehicle according to any one of the first through third aspects of the invention, a third fastened portion as still another one of the plurality of fastened portions is disposed in a position which does not overlap the axis of the second electric motor in the vertical direction and which is higher than a pedal of the electric vehicle in the vertical direction.

According to a seventh aspect of the invention, in the electric vehicle according to any one of the fourth through sixth aspects of the invention, the plurality of fastened portions consist of the first fastened portion, the second fastened portion and the third fastened portion, wherein the first fastened portion, the second fastened portion and the third fastened portion are arranged at equal angular intervals in the circumferential direction of the stator core.

In the electric vehicle according to the first aspect of the invention, (a) the casing has the upper casing portion and the lower casing portion that is disposed on the lower side of the upper casing portion in the vertical direction of the electric vehicle, (b) the electric-power control apparatus is housed in the upper casing portion while the drive apparatus is housed in the lower casing portion, (c) the first electric motor, the second electric motor and the transmission device have respective axes all of which are parallel to the width direction of the electric vehicle, (d) the axis of the second electric motor, the axis of the transmission device and the axis of the first electric motor are arranged in this order from above to below in the vertical direction, (e) the axis of the first electric motor, the axis of the transmission device and the axis of the second electric motor are arranged in this order from front to rear in the longitudinal direction of the electric vehicle, (f) the second electric motor includes the stator core that is provided with the plurality of fastened portions such that the first fastened portion as one of the plurality of fastened portions is disposed in the position which overlaps the upper casing portion in the vertical direction and which is located on the front side of the axis of the second electric motor in the longitudinal direction, and (g) another one of the plurality of fastened portions is disposed in the position which does not overlap the upper casing portion in the circumferential direction of the stator core. In the electric vehicle in which the first fastened portion is disposed in the position which overlaps the upper casing portion in the vertical direction and which is located on the front side of the axis of the second electric motor in the longitudinal direction, it is possible to suppress a distance by which the first fastened portion protrudes toward the upper casing portion in the vertical direction, as compared with an arrangement in which the first fastened portion is not disposed in such a position. With the first fastened portion being disposed in such a position, it is possible to reduce a size of the mechanical-electrical integrated unit in which the drive apparatus and the electric-power control apparatus are housed in the same casing. If any one of the plurality of fastened portions is not disposed in the position overlapping the upper casing portion in the vertical direction, an angular interval between each adjacent two of the fastened portions in the circumferential direction is increased whereby the stator core of the second electric motor cannot be stably held by the casing. Further, in the electric vehicle in which the another one of the plurality of fastened portions is disposed in the position which does not overlap the upper casing portion in the circumferential direction of the stator core, the reduction of the size of the mechanical-electrical integrated unit is not impeded.

In the electric vehicle according to the second aspect of the invention, the first fastened portion is disposed in the position which is the same or lower than the uppermost portion of the yoke of the stator core in the vertical direction and which is the same or more rear than the frontmost portion of the yoke of the stator core in the longitudinal direction. Owing to the arrangement, the size of the mechanical-electrical integrated unit can be further reduced.

In the electric vehicle according to the third aspect of the invention, the second fastened portion as the another one of the plurality of fastened portions is disposed in the position which is lower than the axis of the transmission device in the vertical direction and which is located on the outer peripheral side of the drive shaft that connects between each of the drive wheels and the differential gear device to which the power is to be transmitted through the transmission device. Owing to the arrangement, it is possible to reduce the size of the mechanical-electrical integrated unit while ensuring an appropriate distance between the axis of the transmission device and the axis of the drive shaft.

In the electric vehicle according to the fourth aspect of the invention, the third fastened portion as the still another one of the plurality of fastened portions is disposed in the position that does not overlap the axis of the second electric motor in the vertical direction. Owing to the arrangement, it is possible to suppress a distance by which the third fastened portion protrudes rearwardly in the longitudinal direction, as compared with an arrangement in which the third fastened portion is not disposed in the position that does not overlap the axis of the second electric motor in the vertical direction. Thus, a dimension of the mechanical-electrical integrated unit in the longitudinal direction can be reduced.

In the electric vehicle according to the fifth aspect of the invention, the third fastened portion as the still another one of the plurality of fastened portions is disposed in the position that is higher than the pedal of the electric vehicle in the vertical direction. Owing to the arrangement in which the third fastened portion is disposed in the position higher than the pedal, it is possible to suppress the third fastened portion from being moved toward the pedal to press the pedal in event of a collision of the electric vehicle, and accordingly to suppress a foot of a vehicle driver operating the pedal, from being pressed by the third fastened portion through the pedal.

In the electric vehicle according to the sixth aspect of the invention, the third fastened portion as the still another one of the plurality of fastened portions is disposed in the position which does not overlap the axis of the second electric motor in the vertical direction and which is higher than the pedal of the electric vehicle in the vertical direction. Owing to the arrangement, it is possible to reduce the dimension of the mechanical-electrical integrated unit in the longitudinal direction, and also to suppress the foot of the vehicle driver from being pressed by the third fastened portion through the pedal.

In the electric vehicle according to the seventh aspect of the invention, (a) the plurality of fastened portions consist of the first fastened portion, the second fastened portion and the third fastened portion, and (b) the first fastened portion, the second fastened portion and the third fastened portion are arranged at equal angular intervals in the circumferential direction of the stator core. Owing to the arrangement in which the plurality of fastened portions consist of the three fastened portions and the three fastened portion are arranged at equal angular intervals in the circumferential direction, the second electric motor can be stably held by the casing and a required number of steps can be reduced when the second electric motor is to be fastened to the casing.

DETAILED DESCRIPTION OF PREFERRED EMBODIMENT

Figure 1:
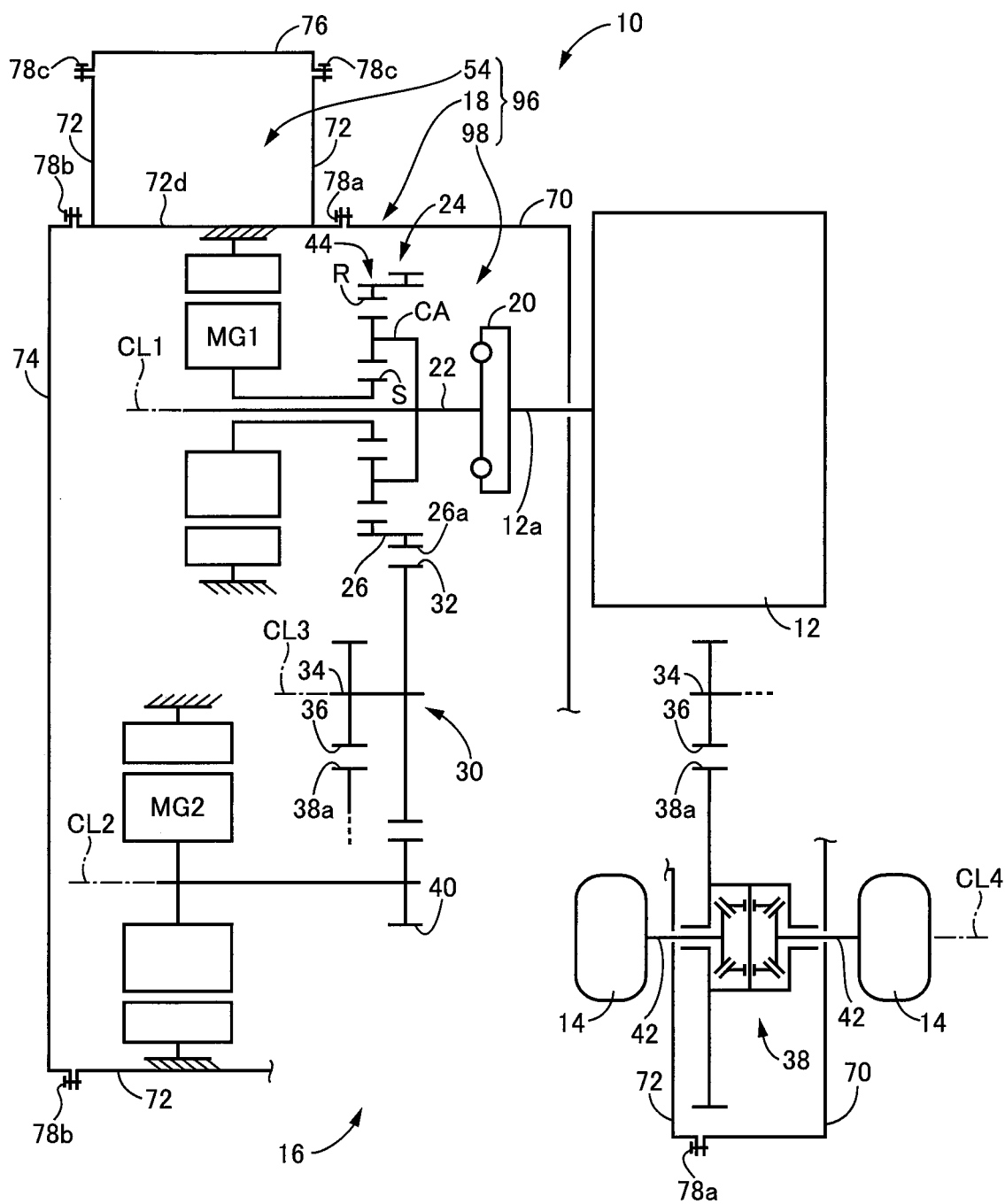
FIG. 1 is a view schematically showing, by way of example, a construction of a hybrid electric vehicle to which the present invention is applied.

Hereinafter, an embodiment of the present invention will be described in detail with reference to the drawings. In the drawings of the embodiment, the drawings are simplified or modified as appropriate, and the dimensional ratios, shapes, and the like of the respective parts are not necessarily accurately drawn.

EMBODIMENT

FIG. 1 is a view schematically showing, by way of example, a construction of a hybrid electric vehicle 10 (hereinafter, simply referred to as "vehicle 10") to which the present invention is applied. The vehicle 10 corresponds to "electric vehicle" in the present invention.

The vehicle 10 includes an engine 12 that functions as a power source, and a first electric motor MG1 and a second electric motor MG2 that are electric motors that function as power sources. The vehicle 10 includes a pair of drive wheels 14 and a power transmission apparatus 16.

The engine 12 is a known internal combustion engine. The first electric motor MG1 and the second electric motor MG2 are, for example, rotating electric machines having motor functions and power generator functions, and are so-called motor generators. The first electric motor MG1 and the second electric motor MG2 are, for example, inner-rotor-type synchronous motors. The first electric motor MG1 and the second electric motor MG2 are housed in a non-rotatable casing 18 which is a non-rotatable member attached to a vehicle body that is a body of the vehicle 10.

The power transmission apparatus 16 is provided in a power transmission path between the engine 12 and the pair of drive wheels 14 and in a power transmission path between the second electric motor MG2 and the pair of drive wheels 14. The power transmission apparatus 16 includes a damper 20, an input shaft 22, a transmission portion 24, a composite gear 26, a driven gear 32, a driven shaft 34, a final gear 36, a differential gear device 38 and a reduction gear 40 that are disposed in the casing 18. The input shaft 22 functions as an input rotary member of the transmission portion 24, and is connected to a crankshaft 12a of the engine 12 through the damper 20, for example. The transmission portion 24 is connected to the input shaft 22. The composite gear 26 is an output rotary body of the transmission portion 24. The composite gear 26 has a drive gear 26a formed on a part of an outer peripheral surface thereof. The drive gear 26a is an output rotary member of the transmission portion 24. The driven gear 32 meshes with the drive gear 26a. The driven gear 32 and the final gear 36 are fixed to the driven shaft 34 so as not to be relatively rotatable. The final gear 36 has a smaller diameter than the driven gear 32 and meshes with a differential ring gear 34a of the differential gear device 38. The reduction gear 40 has a smaller diameter than the driven gear 32 and meshes with the driven gear 32. A rotor shaft of the second electric motor MG2 is connected to the reduction gear 40, and the second electric motor MG2 is connected to the reduction gear 40 in a power transmittable manner. The power transmission apparatus 16 includes a pair of drive shafts 42 connected to the differential gear device 38. It is noted that the driven gear 32, the driven shaft 34 and the final gear 36 cooperate to constitute a transmission device 30 that is configured to transmit the power outputted by the second electric motor MG2 toward the pair of drive wheels 14, and that the transmission device 30 corresponds to "transmission device" in the present invention.

The power transmission apparatus 16 constructed as described above is suitably used for a vehicle of a front engine front drive (FF) type. In the present embodiment, the vehicle 10 is the vehicle of FF type. The power transmission apparatus 16 transmits a power outputted from the engine 12 to the driven gear 32 via the transmission portion 24. The power transmission apparatus 16 transmits a power outputted from the second electric motor MG2 to the driven gear 32 via the reduction gear 40. The power transmission apparatus 16 transmits the power transmitted to the driven gear 32, to the pair of drive wheels 14 sequentially via the driven shaft 34, the final gear 36, the differential gear device 38 and the drive shafts 42, for example. The differential gear device 38 is a differential gear device that distributes the power transmitted via the final gear 36 to the pair of drive wheels 14. It is noted that the differential gear device 38 corresponds to "differential gear device" in the present invention.

The power transmission apparatus 16 has a first axis CL1, a second axis CL2, a third axis CL3, and a fourth axis CL4, which are rotational center lines. These four axes CL1, CL2, CL3, CL4 are parallel to each other. The first axis CL1 is an axis of the input shaft 22 and an axis of the rotor shaft of the first electric motor MG1. That is, the first axis CL1 is a rotational center line of the first electric motor MG1. The transmission portion 24 and the first electric motor MG1 are disposed around the first axis CL1. That is, in the transmission portion 24, the drive gear 26a is disposed coaxially with the first electric motor MG1. The second axis CL2 is an axis of the rotor shaft of the second electric motor MG2. That is, the second axis CL2 is a rotational center line of the second electric motor MG2. The second electric motor MG2 and the reduction gear 40 are disposed around the second axis CL2. The third axis CL3 is an axis of the driven shaft 34. The driven gear 32 and the final gear 36 are disposed around the third axis CL3. That is, the third axis CL3 is a rotational center line of the driven gear 32, the driven shaft 34 and the final gear 36. The fourth axis CL4 is an axis of each of the drive shafts 42 and an axis of the differential gear device 38. That is, the fourth axis CL4 is a rotational center line of the differential gear device 38. The differential gear device 38 is disposed around the fourth axis CL4. It is noted that the first axis CL1 corresponds to "axis of the first electric motor" in the present invention, that the second axis CL2 corresponds to "axis of the second electric motor" in the present invention, and that the third axis CL3 corresponds to "axis of the transmission device".

The transmission portion 24 includes the first electric motor MG1 and a differential mechanism 44. The differential mechanism 44 is constituted by a known single-pinion type planetary gear device, and includes a sun gear S, a carrier CA and a ring gear R. The sun gear S is connected to the rotor shaft of the first electric motor MG1, and the first electric motor MG1 is connected to the sun gear S in a power transmittable manner. The carrier CA is connected to the input shaft 22, and is connected to the engine 12, through the input shaft 22, for example, in a power transmittable manner. The ring gear R is formed on a part of an inner circumferential of the composite gear 26, and is integrally connected to the drive gear 26a.

The differential mechanism 44 is a differential mechanism which is connected to the engine 12 in a power transmittable manner and which generates a differential effect. The first electric motor MG1 is a differential electric motor that is connected to the differential mechanism 44 in a power transmittable manner. The differential mechanism 44 is a power dividing mechanism for mechanically dividing the power of the engine 12 between the first electric motor MG1 and the drive gear 26a. The transmission portion 24 is a known electric transmission mechanism in which the operating state of the first electric motor MG1 is controlled to control the operating state of the differential mechanism 44. The first electric motor MG1 may also function as a power source that outputs the power to the pair of drive wheels 14 via the differential mechanism 44.

Figure 2:
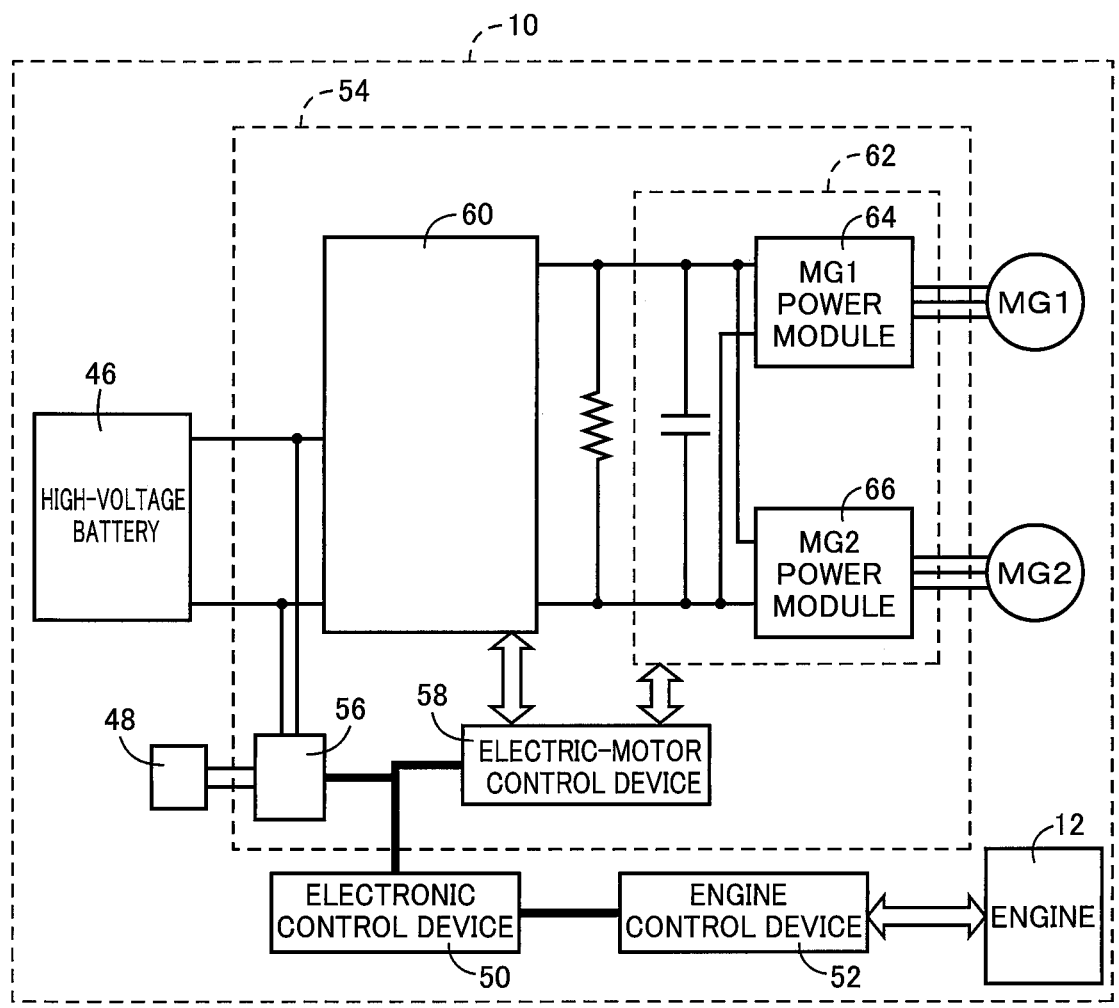
FIG. 2 is a view showing an example of an electrical configuration of an electric-power control unit and other components of the hybrid electric vehicle.

FIG. 2 is a view showing an example of an electrical configuration of an electric-power control unit 54 and the like.

The vehicle 10 further includes a high-voltage battery 46, an auxiliary battery 48 and the electric-power control unit 54.

The high-voltage battery 46 is a chargeable and dischargeable secondary battery such as a nickel-hydrogen secondary battery or a lithium ion battery. The high-voltage battery 46 is connected to the electric-power control unit 54. The high-voltage battery 46 is a battery for driving the first electric motor MG1 and the second electric motor MG2. For example, the stored electric power is supplied from the high-voltage battery 46 to the second electric motor MG2 via the electric-power control unit 54. Each of the first electric motor MG1 and the second electric motor MG2 generates an electric power by the power of the engine 12 and the driven force inputted from the pair of drive wheels 14, and the high-voltage battery 46 is charged with the generated electric power supplied via the electric-power control unit 54.

The auxiliary battery 48 is a chargeable and dischargeable secondary battery such as a lead storage battery. The auxiliary battery 48 has a charging voltage lower than that of the high-voltage battery 46. The auxiliary battery 48 is charged with the electric power generated by an alternator rotationally driven by the engine 12 or the electric power supplied from the high-voltage battery 46 via a DC-DC converter 56.

The electric-power control unit 54 includes the DC-DC converter 56, a boost converter 60, an inverter 62 and an electric-motor control device 58. The electric-power control unit 54 is an electric-power control device that controls the electric power transferred between the high-voltage battery 46 and each of the first electric motor MG1 and the second electric motor MG2, that is, the electric power transmitted and received by each of the first electric motor MG1 and the second electric motor MG2. The electric-power control unit 54 corresponds to "electric-power control apparatus" in the present invention.

The DC-DC converter 56 is connected to the high-voltage battery 46. The DC-DC converter 56 functions as a charging device that reduces the voltage of the high-voltage battery 46 to a voltage equivalent to that of the auxiliary battery 48 and charges the auxiliary battery 48. The auxiliary battery 48 supplies the electric power for operating auxiliary devices provided in the vehicle 10. The auxiliary battery 48 supplies the electric power for operating, for example, an engine control device 52 and the electric-motor control device 58.

The boost converter 60 includes a reactor, a switching element and the like (not shown). The boost converter 60 is a buck-boost circuit having a function of increasing the voltage of the high-voltage battery 46 and supplying the increased voltage to the inverter 62, and a function of reducing the voltage converted into a direct current by the inverter 62 and supplying the reduced voltage to the high-voltage battery 46.

The inverter 62 includes an MG1 power module 64 and an MG2 power module 66. Each of the MG1 power module 64 and the MG2 power module 66 includes a switching element (not shown). The inverter 62 converts the direct current outputted from the boost converter 60 into an alternating current for driving the first electric motor MG1 and the second electric motor MG2. The inverter 62 converts the alternating current generated by the first electric motor MG1 and the alternating current generated by the second electric motor MG2 into the direct current. The inverter 62 uses the electric power generated by the first electric motor MG1 as the electric power for driving the second electric motor MG2 in accordance with a running state of the vehicle 10.

An electronic control device 50 transmits and receives signals to and from the DC-DC converter 56, the electric-motor control device 58 and the engine control device 52 via, for example, a known controller area network (CAN) communication line. The electronic control device 50 controls the running state of the vehicle 10 based on, for example, signals from sensors (not shown) or the like. The electronic control device 50 controls, for example, the DC-DC converter 56 to reduce the voltage of the high-voltage battery 46 to a voltage equivalent to that of the auxiliary battery 48. In the present embodiment, the electronic control device 50 and the engine control device 52 are control devices that are separate from the electric-power control unit 54, and particularly from the electric-motor control device 58.

The electric-motor control device 58 controls the first electric motor MG1 and the second electric motor MG2 based on a requested output value supplied from the electronic control device 50. For example, the electric-motor control device 58 controls the boost converter 60 and the inverter 62 to control an output of each of the first electric motor MG1 and the second electric motor MG2.

Returning to FIG. 1, a transaxle 98 is a drive apparatus including the first electric motor MG1, the second electric motor MG2, the transmission portion 24, the composite gear 26 and the transmission device 30 (the driven gear 32, the driven shaft 34 and the final gear 36). A drive unit 96 is a mechanical-electrical integrated unit, i.e., a unit in which the transaxle 98 and the electric-power control unit 54 are integrally housed in the same casing 18. The meaning of the "same casing" will be described later. The transaxle 98 corresponds to "drive apparatus" in the present invention, and the drive unit 96 corresponds to "mechanical-electrical integrated unit" in the present invention.

Figure 3:
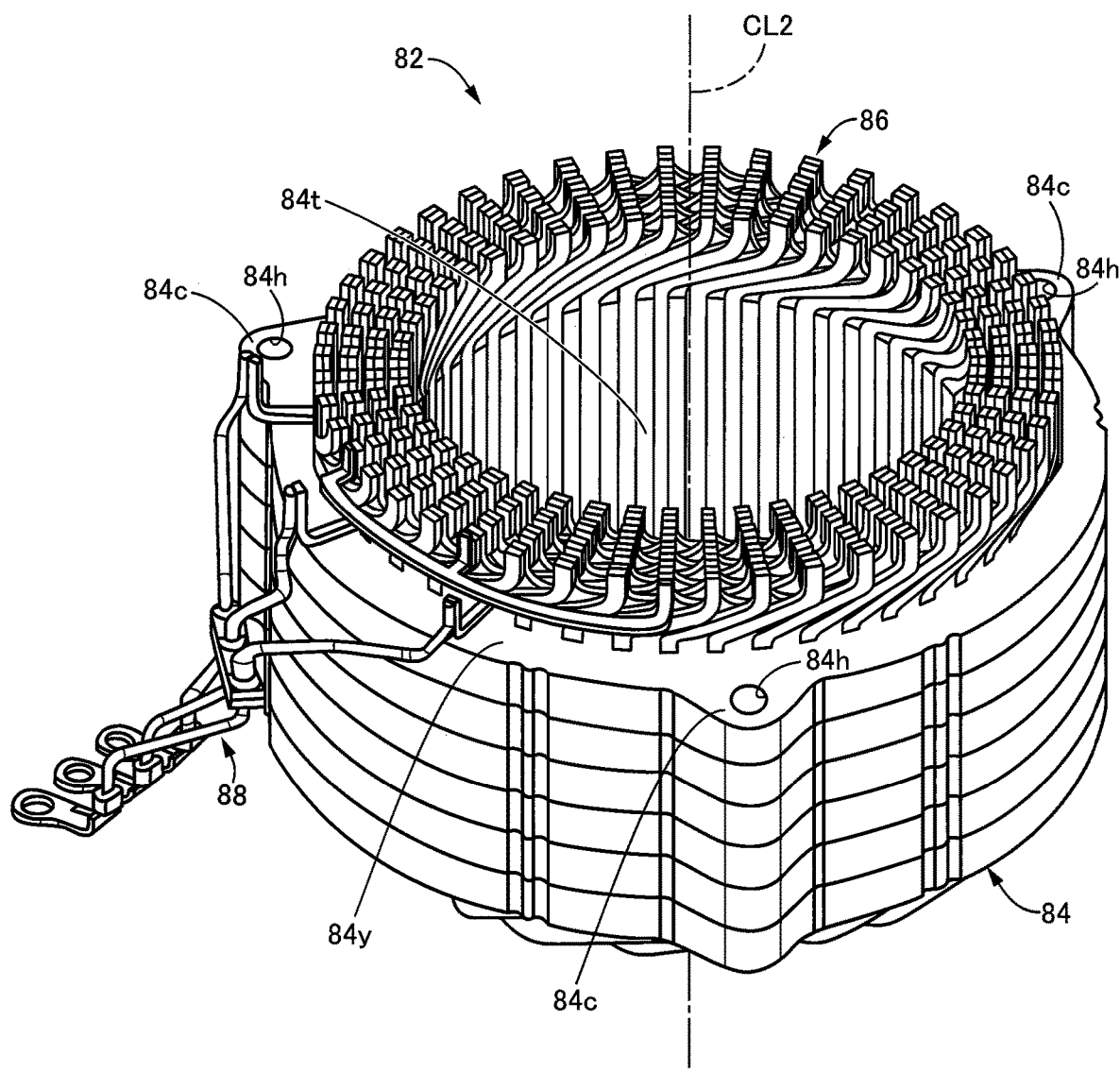
FIG. 3 is a perspective view showing a stator of a second electric motor in a state before it is installed in the hybrid electric vehicle.

FIG. 3 is a perspective view showing a stator 82 of the second electric motor MG2 in a state before it is installed in the vehicle 10. To make the invention easier to understand, the axis of the second electric motor MG2 will be explained as the second axis CL2, which is the axis after it is installed in vehicle 10. Since the stator of the first electric motor MG1 has substantially the same construction as the stator 82 of the second electric motor MG2, the second electric motor MG2 will be described as a representative, and description of the first electric motor MG1 is not provided.

The stator 82 of the second electric motor MG2 includes a stator core 84, a coil 86 and a power line 88.

In the following description, a direction parallel to the second axis CL2 will be simply referred to as "second axis CL2 direction", a radial direction of the stator core 84 will be simply referred to as "radial direction", and a circumferential direction of the stator core 84 will be simply referred to as "circumferential direction". The radial direction of the stator core 84 is synonymous with a radial direction centered on the second axis CL2.

The stator core 84 has a cylindrical body whose center lies on the second axis CL2, wherein the cylindrical body is constituted by a plurality of electromagnetic steel plates laminated on each other, for example. On an inner circumferential surface of the cylindrical-shaped stator core 84, tooth portions 84t are provided at equal angular intervals, such that each of the tooth portions 84t protrudes inwardly in the radial direction and extends in the second axis CL2 direction. Each adjacent pair of the tooth portions 84t define a slot portion therebetween. It is noted that the stator core 84 does not necessarily have to be constituted by the plurality of electromagnetic steel plates that are laminated on each other, but may be formed by molding electromagnetic powder, solid or the like. The stator core 84 corresponds to "stator core" in the present invention.

The stator core 84 is provided with a plurality of fastened portions 84c that are disposed in its outer peripheral portion. In the present embodiment, the plurality of fastened portions 84c consist of three fastened portions 84c. In the stator core 84, each of the fastened portions 84c locally protrudes outwardly in the radial direction, and extends in the second axis CL2 direction. Each of the fastened portions 84c protrudes in an arc shape, and has a through-hole 84h extending through in the second axis CL2 direction. As viewed in the second axis CL2 direction, axes (centers) of the respective through-holes 84h are arranged at equal angular intervals (of $2\pi/3$[rad] in the present embodiment) in the circumferential direction. The axes of the respective through-holes 84h are distant from the second axis CL by the same distance in the radial direction.

The coil 86 is wound on the tooth portions 84t of the stator core 84, and is a three-phase coil for U-phase, V-phase and W-phase, for example. The coil 86 includes a protrusion portion protruding outwardly from the stator core 84 in the second axis CL2 direction, and the protrusion portion constitutes a coil end. The power line 88 is an elongated-plate-shaped metal body. The power line 88 is electrically connected to the three-phase winding in the coil end, with an end portion of the power line 88 being fixed to an end portion of the three-phase winding by welding, for example. The power line 88 is electrically connected at another end portion thereof to a crimp terminal by caulking, for example. The stator core 84 has a yoke 84y that is constituted by a portion of the stator core 84 which is other than the tooth portions 84t and which is other than the fastened portions 84c. The yoke 84y serves as a path of magnetic field lines between the tooth portions 84t that serve as electromagnets.

Figure 4:
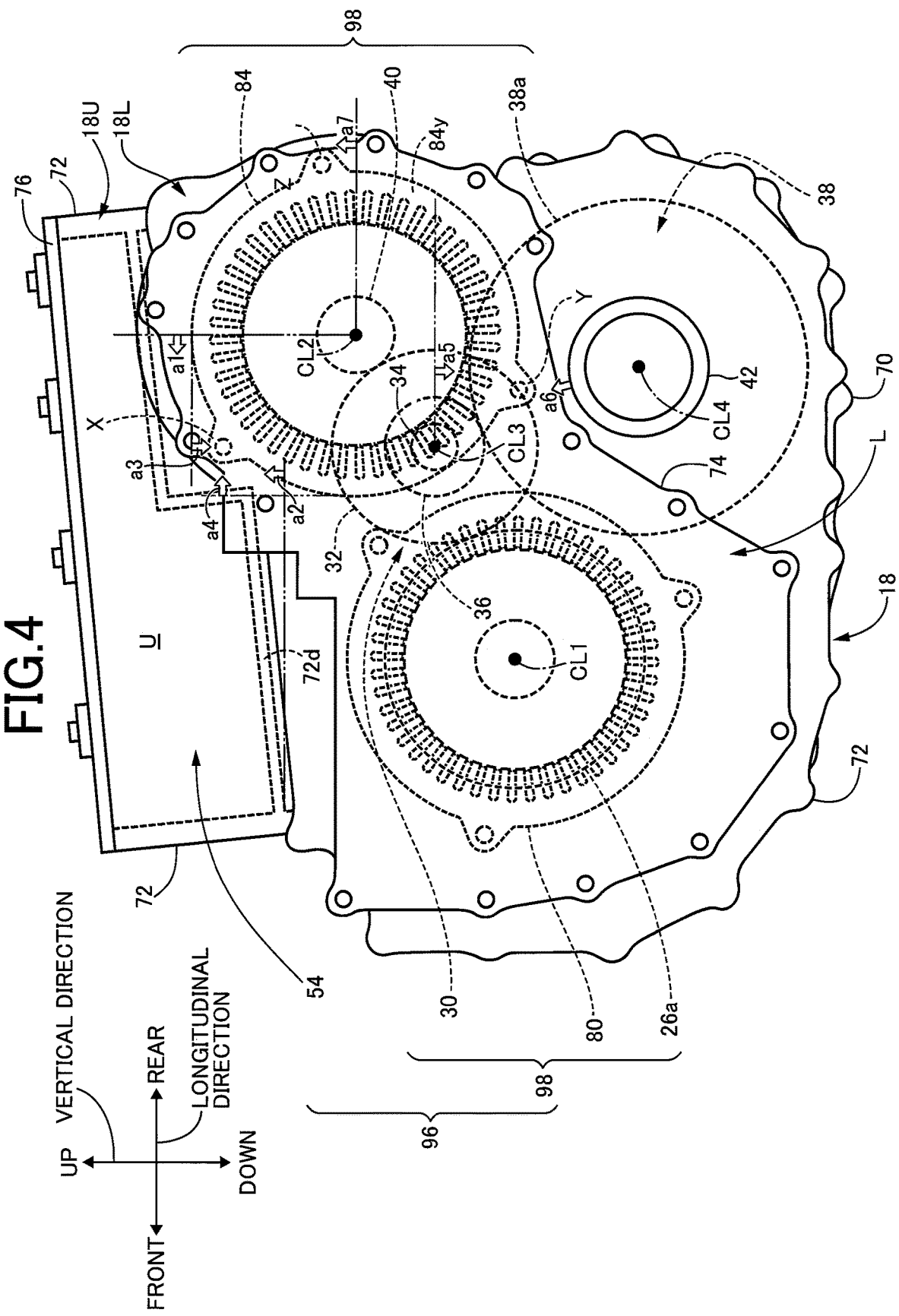
FIG. 4 is a view showing, by way of example, an arrangement of various components of a drive unit installed in the hybrid electric vehicle.

FIG. 4 is a view showing, by way of example, an arrangement of various components of the drive unit 96 installed in the vehicle 10. It is noted that "VERTICAL DIRECTION", "LONGITUDINAL DIRECTION" and "WIDTH DIRECTION" shown in FIG. 4 and FIG. 5 described later indicate directions in a state in which the drive unit 96 is installed in the vehicle 10. The "VERTICAL DIRECTION" is a vertical direction of the vehicle 10. The "LONGITUDINAL DIRECTION" is a longitudinal direction of the vehicle 10. The "WIDTH DIRECTION" is a width direction of the vehicle 10 and is a horizontal direction perpendicular to the longitudinal direction of the vehicle 10. The drive unit 96 is disposed in a position adjacent to the engine 12.

The casing 18 is made of, for example, a casting of an aluminum alloy. The casing 18 includes a first casing portion 70, a second casing portion 72, a third casing portion 74 and a fourth casing portion 76.

The first casing portion 70 is a bottomed cylindrical member. The second casing portion 72 is a bottomed cylindrical member, and is provided with a partition wall 72d inside thereof. The second casing portion 72 includes a bottom wall and a side wall that extends upwardly from an outer periphery of the bottom wall, such that the bottom wall, the side wall and the above-described partition wall 72d are formed integrally with one another, for example, by casting. The first casing portion 70 and the second casing portion 72 are integrally connected through fastening members such as bolts 78a (see FIG. 1) such that an opening portion of the first casing portion 70 and an engine-side portion of the second casing portion 72 are aligned. With the second casing portion 72 being connected with the first casing portion 70, the casing 18 has an upper space U and a lower space L that are vertically separated from each other by the partition wall 72d.

The casing 18 includes an upper casing portion 18U that defines or surrounds the above-described upper space U and a lower casing portion 18L that defines or surrounds the above-described lower space L. In the casing 18, the lower casing portion 18L is disposed on a lower side of the upper casing portion 18U in the vertical direction.

The partition wall 72d is a common partition wall that defines a lower end of the upper casing portion 18U and an upper end of the lower casing portion 18L. Therefore, where the upper casing portion 18U and the lower casing portion 18L are separated from each other, the inside of at least one of the upper casing portion 18U and the lower casing portion 18L is necessarily exposed to the outside. The above-described "same casing" means a casing in which the inside of at least one of the upper casing portion 18U and the lower casing portion 18L is necessarily exposed to the outside where the upper casing portion 18U and the lower casing portion 18L are separated from each other.

The second casing portion 72 has an opening portion in an opposite portion of the side wall that defines the lower space L, wherein the opposite portion of the side wall is opposite to the engine 12. The second casing portion 72 has another opening portion in its upper surface that defines the upper space U. That is, the lower casing portion 18L has an opening portion in an opposite portion of its side wall which is opposite to the engine 12, while the upper casing portion 18U has an opening portion in its upper surface. The electric-power control unit 54 and the transaxle 98 are housed in the upper casing portion 18U and the lower casing portion 18L, respectively, when being installed in the vehicle 10.

The third casing portion 74 is a plate-shaped member joined to the second casing portion 72 so as to cover the opening portion of the side wall of the second casing portion 72. The first and second electric motors MG1, MG2 are attached onto respective seat surfaces provided in the lower space L, through bolts, before the third casing portion 74 is joined to the second casing portion 72, namely, before the opening portion of the side wall of the second casing portion 72 is closed. The seat surfaces are provided with first and second mounting holes (not shown). The first mounting holes are located in respective positions corresponding to through-holes of respective fastened portions of a stator core 80 (see FIG. 4) of the first electric motor MG1. The second mounting holes are located in respective positions corresponding to the through-holes 84h of the respective fastened portions 84*c* of the stator core 84 (see FIG. 4) of the second electric motor MG2. The first electric motor MG1 is fixedly disposed in the lower space L of the casing 18, with the bolts being inserted in the respective through-holes of the respective fastened portions and being screwed in the respective first mounting holes. The second electric motor MG2 is fixedly disposed in the lower space L of the casing 18, with the bolts being inserted in the respective through-holes 84*h* of the respective fastened portions 84*c* and being screwed in the respective second mounting holes. The second casing portion 72 and the third casing portion 74 are integrally connected to each other through fastening members such as bolts 78*b* (see FIG. 1).

The fourth casing portion 76 is a plate-shaped member joined to the second casing portion 72 so as to cover the opening portion of the upper surface of the second casing portion 72. The electric-power control unit 54 is disposed in the upper space U, before the fourth casing portion 76 is joined to the second casing portion 72, namely, before the opening portion of the upper surface of the second casing portion 72 is closed. The second casing portion 72 and the fourth casing portion 76 are integrally connected to each other through fastening members such as bolts 78*c* (see FIG. 1).

Thus, the electric-power control unit 54 is housed in the upper casing portion 18U while the transaxle 98 is housed in the lower casing portion 18L.

When being installed in the vehicle 10, the transaxle 98 is disposed such that, for example, each of the first axis CL1, second axis CL2, third axis CL3, and fourth axis CL4 is parallel to the width direction of the vehicle 10, such that the second axis CL2, third axis CL3, first axis CL1 and fourth axis CL4 are arranged in this order in the vertical direction from top to bottom, and such that the first axis CL1, third axis CL3, fourth axis CL4 and second axis CL2 are arranged in this order in the longitudinal direction from front to rear. Owing to the arrangement, it is possible to reduce a size of the drive unit 96 while ensuring appropriate distances between the first axis CL1, second axis CL2, third axis CL3 and fourth axis CL4. The "size of the drive unit 96" means an overall size of the drive unit 96 when sizes of respective components such as the first electric motor MG1, the second electric motor MG2 and the transmission device 30, which are housed in the casing 18, are not changed. In other words, "reducing the size of the drive unit 96" means that the casing 18 can accommodate the components such as the first electric motor MG1, the second electric motor MG2 and the transmission device 30 more compact in size.

In the following description, the plurality of fastened portions 84*c* of the stator core 84 of the second electric motor MG2 will be referred to as first, second and third fastened portions X, Y, Z.

As indicated by arrow a1 in FIG. 4, the first fastened portion X is located on a front side of the second axis CL2 in the longitudinal direction. Further, as indicated by arrow a2 in FIG. 4, the first fastened portion X is located on an upper side of a lower end of the upper casing portion 18U. That is, the first fastened portion X is disposed in a position which overlaps the upper casing portion 18U in the vertical direction and which is located on a front side of the second axis CL2 in the longitudinal direction. Preferably, as indicated by arrow a3 in FIG. 4, the first fastened portion X is disposed in the position that is lower than an uppermost portion of the yoke 84*y* of the stator core 84 in the vertical direction. Further, preferably, as indicated by arrow a4 in FIG. 4, the first fastened portion X is disposed in the position that is located on a rear side of a frontmost portion of the yoke 84*y* of the stator core 84 in the longitudinal direction.

Each of the second fastened portion Y and the third fastened portion Z is another one of the fastened portions 84*c* that is other than the first fastened portion X, and is disposed in a position that does not overlap the upper casing portion 18U in the circumferential direction. That is, each of the second fastened portion Y and the third fastened portion Z is disposed in the position that does not overlap the upper casing portion 18U as viewed in the radial direction. As indicated by arrow a5 in FIG. 4, the second fastened portion Y is disposed in the position that is lower than the third axis CL3 as the axis of the transmission device 30. Further, as indicated by arrow a6 in FIG. 4, the second fastened portion Y is disposed in the position that is located on an outer peripheral side of an outermost diameter portion of the drive shaft 42. As indicated by arrow a7, the third fastened portion Z is disposed in the position which is higher than the second axis CL2 in the vertical direction, an which does not overlap the second axis CL2 in the vertical direction. When the transaxle 98 is installed in the vehicle 10, the first fastened portion X, second fastened portion Y and third fastened portion Z are located in fastened positions at which the stator core 84 of the second electric motor MG2 is fastened to the casing 18. Each of the second fastened portion Y and the third fastened portion Z corresponds to "another one of the plurality of fastened portions" in the present invention.

As described above, the electric-power control unit 54 is housed in the upper casing portion 18U. The upper casing portion 18U is disposed in a position that is included in the lower casing portion 18L as viewed from above in the vertical direction. The upper casing portion 18U is disposed in the position that is included in the lower casing portion 18L in the longitudinal direction. That is, the lower casing portion 18L extends at least between two positions in the longitudinal direction, wherein one of the two positions corresponds to a frontmost portion of the upper casing portion 18U while the other of the two positions corresponds to a rearmost portion of the upper casing portion 18U. For example, the upper casing portion 18U extends between two positions in the longitudinal direction, wherein one of the two positions is located on a rear side of the second axis CL2 in the longitudinal direction while the other of the two positions is located on a front side of the first axis CL1 in the longitudinal direction. The upper casing portion 18U is disposed in the position that is included in the lower casing portion 18L also in the width direction. That is, the lower casing portion 18L extends at least between two positions in the width direction, wherein one of the two positions corresponds to a leftmost portion of the upper casing portion 18U while the other of the two positions corresponds to a rightmost portion of the upper casing portion 18U. The upper space U defined by the upper casing portion 18U is a combination of rectangular parallelepiped spaces, for example. In the vertical direction, the upper space U is deeper on side of the first electric motor MG1 side than on side of the second electric motor MG2 due to the arrangement of the first and second electric motors MG1, MG2.

Although not being described in detail, when the first electric motor MG1 is installed in the vehicle 10, the plurality of fastened portions provided in the stator core 80 of the first electric motor MG1 are located in respective positions that do not impede reduction of the size of the drive unit 96.

Figure 5:
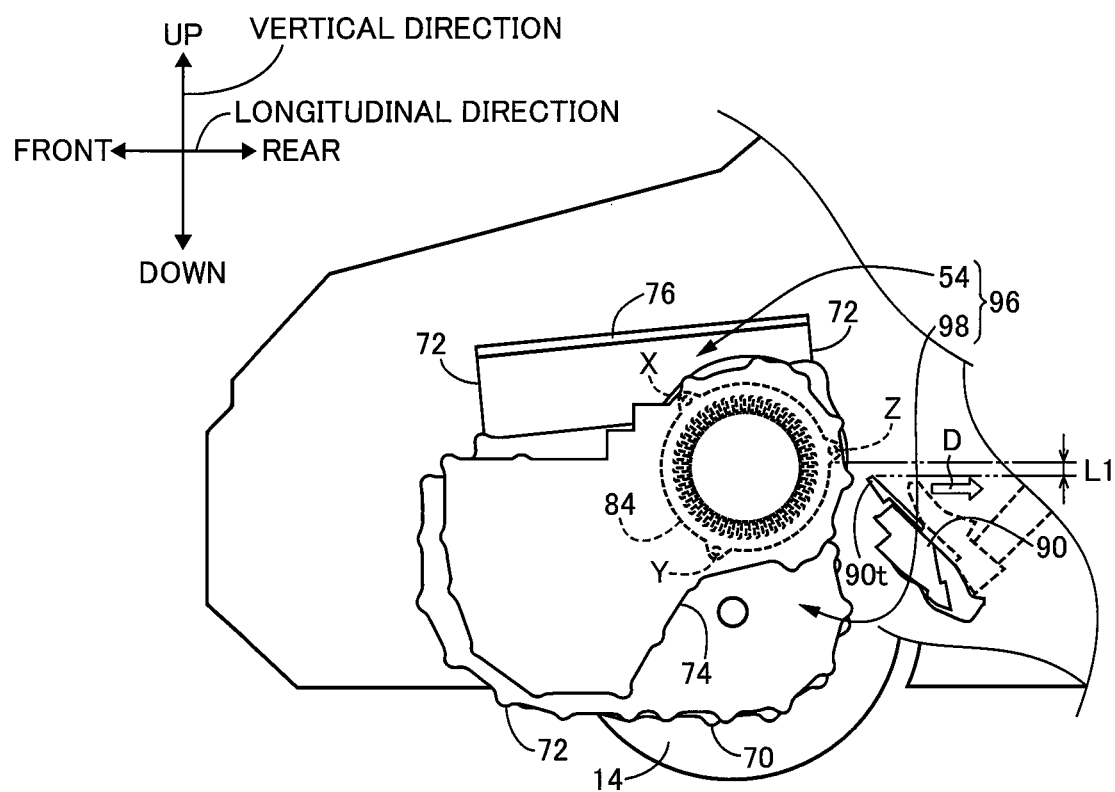
FIG. 5 is a view showing, by way of example, a positional relationship between an accelerator pedal and the drive unit installed in the hybrid electric vehicle.

FIG. 5 is a view showing, by way of example, a positional relationship between an accelerator pedal 90 and the drive unit 96 installed in the vehicle 10.

The third fastened portion Z is disposed in the position that is higher than the accelerator pedal 90 in the vertical direction. Specifically, the third fastened portion Z is disposed in the position that is higher than a highest position in which a distal end 90t of a movable portion of the accelerator pedal 90 is moved to the highest, in the vertical direction. As shown in FIG. 5, the third fastened portion Z is disposed in the position that is higher than the highest position (in which the distal end 90t of the accelerator pedal 90 is moved to the highest) by a distance LI in the vertical direction. As described above, the first fastened portion X, second fastened portion Y and third fastened portion Z are arranged at equal angular intervals in the circumferential direction. It is noted that the accelerator pedal 90 corresponds to "pedal" in the present invention.

In the present embodiment, (a) the casing 18 has the upper casing portion 18U and the lower casing portion 18L that is disposed on the lower side of the upper casing portion 18U in the vertical direction of the vehicle 10, (b) the electric-power control unit 54 is housed in the upper casing portion 18U while the transaxle 98 is housed in the lower casing portion 18L, (c) the first electric motor MG1, the second electric motor MG2 and the transmission device 30 have respective first, second and third axes CL1, CL2, CL3 all of which are parallel to the width direction of the vehicle 10, (d) the second axis CL2 of the second electric motor MG2, the third axis CL3 of the transmission device 30 and the first axis CL1 of the first electric motor MG1 are arranged in this order from above to below in the vertical direction, (e) the first axis CL1 of the first electric motor MG1, the third axis CL3 of the transmission device 30 and the second axis CL2 of the second electric motor MG2 are arranged in this order from front to rear in the longitudinal direction of the vehicle 10, (f) the second electric motor MG2 includes the stator core 84 that is provided with the plurality of fastened portions 84c such that the first fastened portion X as one of the plurality of fastened portions 84c is disposed in the position which overlaps the upper casing portion 18U in the vertical direction and which is located on the front side of the second axis CL2 of the second electric motor MG2 in the longitudinal direction, and (g) each of the second and third fastened portions Y, Z as the others of the plurality of fastened portions 84c is disposed in the position which does not overlap the upper casing portion 18U in the circumferential direction of the stator core 84. In the vehicle 10 in which the first fastened portion X is disposed in the position which overlaps the upper casing portion 18U in the vertical direction and which is located on the front side of the second axis CL2 of the second electric motor MG2 in the longitudinal direction, it is possible to suppress a distance by which the first fastened portion X protrudes toward the upper casing portion 18U in the vertical direction, as compared with an arrangement in which the first fastened portion X is not disposed in such a position. With the first fastened portion X being disposed in such a position, it is possible to reduce the size of the drive unit 96, particularly, the dimension of the drive unit 96 in the vertical direction. If any one of the plurality of fastened portions 84c is not disposed in the position overlapping the upper casing portion 18U in the vertical direction, an angular interval between each adjacent two of the fastened portions 84c in the circumferential direction is increased whereby the stator core 84 of the second electric motor MG2 cannot be stably held by the casing 18. Further, in the vehicle 10 in which each of the second and third fastened portions Y, Z is disposed in the position which does not overlap the upper casing portion 18U in the circumferential direction of the stator core 84, the reduction of the size of the drive unit 96 is not impeded.

In the present embodiment, the first fastened portion X is disposed in the position which is lower than the uppermost portion of the yoke 84y of the stator core 84 in the vertical direction and which is more rear than the frontmost portion of the yoke 84y of the stator core 84 in the longitudinal direction. Owing to the arrangement, the size of the drive unit 96 can be reduced.

In the present embodiment, the second fastened portion Y is disposed in the position which is lower than the third axis CL3 of the transmission device 30 in the vertical direction and which is located on the outer peripheral side of the drive shaft 42 that connects between each of the drive wheels 14 and the differential gear device 38 to which the power is to be transmitted through the transmission device 30. Owing to the arrangement, it is possible to reduce the size of the drive unit 96 while ensuring an appropriate distance between the third axis CL3 of the transmission device 30 and the four axis CL4 of the drive shaft 42.

In the present embodiment, the third fastened portion Z is disposed in the position that does not overlap the second axis CL2 of the second electric motor MG2 in the vertical direction. Owing to the arrangement, it is possible to suppress a distance by which the third fastened portion Z protrudes rearwardly in the longitudinal direction, as compared with an arrangement in which the third fastened portion Z is not disposed in the position that does not overlap the second axis CL2 of the second electric motor MG2 in the vertical direction. Thus, the dimension of the drive unit 96 in the longitudinal direction can be reduced.

In the present embodiment, the third fastened portion Z is disposed in the position that is higher than the accelerator pedal 90. Owing to the arrangement in which the third fastened portion Z is disposed in the position higher than the accelerator pedal 90, it is possible to suppress the third fastened portion Z from being moved toward the accelerator pedal 90 to press the accelerator pedal 90 in event of a collision of the vehicle 10, and accordingly to suppress a foot of a vehicle driver operating the accelerator pedal 90, from being pressed by the third fastened portion Z through the accelerator pedal 90 in a direction indicated by white arrow D in FIG. 5.

In the present embodiment, (a) the plurality of fastened portions 84c consist of the first fastened portion X, the second fastened portion Y and the third fastened portion Z, and (b) the first fastened portion X, the second fastened portion Y and the third fastened portion Z are arranged at equal angular intervals in the circumferential direction of the stator core 84. Owing to the arrangement in which the plurality of fastened portions 84c consist of the three fastened portions 84c and the three fastened portion are arranged at equal angular intervals in the circumferential direction, the second electric motor MG2 can be stably held by the casing 18 and a required number of steps can be reduced when the second electric motor MG2 is to be fastened to the casing 18.

Although the embodiment of the present invention has been described in detail with reference to the drawings, the present invention is also applicable to other forms.

In the above-described embodiment, the first fastened portion X is disposed in the position which is lower than the uppermost portion of the yoke 84y of the stator core 84 in the vertical direction and which is located on the rear side of the frontmost portion of the yoke 84y of the stator core 84 in the longitudinal direction. However, the present invention is not limited to these details. For example, an outer peripheral end of the first fastened portion X may be located on an upper side of the uppermost portion of the yoke 84y of the stator core 84 in the vertical direction, as long as the first fastened portion X is located on the front side of the second axis CL2 of the second electric motor MG2 in the longitudinal direction. In this arrangement, too, it is possible to suppress a distance by which the first fastened portion X protrudes toward the upper casing portion 18U in the vertical direction, as compared with an arrangement in which the first fastened portion X is disposed in a position overlapping the second axis CL2 of the second electric motor MG2 in the longitudinal direction. It is preferable that the first fastened portion X is disposed in the position which is not higher than the uppermost portion of the yoke 84y of the stator core 84 in the vertical direction and which is not more front than the frontmost portion of the yoke 84y of the stator core 84 in the longitudinal direction. In this preferable arrangement, dimensions of the drive unit 96 in the vertical direction and the longitudinal direction are dependent on the arrangement of the yoke 84y of the stator core 84 of the second electric motor MG2, and the first fastened portion X does not impede reduction of the size of the drive unit 96.

In the above-described embodiment, the second fastened portion Y is disposed in the position which is lower than the third axis CL3 of the transmission device 30 and which is located on the outer peripheral side of the outermost diameter portion of the drive shaft 42. However, the present invention is not limited to these details. For example, the second fastened portion Y may be disposed in a position that is higher than the third axis CL3 of the transmission device 30.

In the above-described embodiment, the third fastened portion Z is disposed in the position which is higher than the second axis CL2 in the vertical direction and which is higher than the distal end 90t of the accelerator pedal 90 in the vertical direction. However, the present invention is not limited to these details. For example, the third fastened portion Z may be disposed in a position which does not overlap the second axis CL2 in the vertical direction and which is lower than the second axis CL2 in the vertical direction. Further, the third fastened portion Z may be disposed in a position that is lower than the distal end 90t of the accelerator pedal 90 in the vertical direction.

In the above-described embodiment, (a) the plurality of fastened portions 84c consist of three fastened portions, i.e., the first fastened portion X, second fastened portion Y and third fastened portion Z, and (b) the first fastened portion X, second fastened portion Y and third fastened portion Z are arranged at equal angular intervals in the circumferential direction of the stator core 84. However, the present invention is not limited to these details. For example, the first fastened portion X, second fastened portion Y and third fastened portion Z do not have to be arranged necessarily at equal angular intervals. Further, for example, the plurality of fastened portions 84c may consist of four or more fastened portions.

In the above-described embodiment, the accelerator pedal 90 corresponds to the "pedal" in the present invention. However, the present invention is not limited to the detail. For example, the "pedal" in the present invention may be constituted by a brake pedal (not shown) or any other pedal that is to be operatively depressed or released by a driver of the vehicle.

In the above-described embodiment, each of the first and second electric motors MG1, MG2 is the motor generator. However, the present invention is not limited to the detail. For example, the first electric motor MG1 may be a rotary electric machine that does not have a motor function as long as having a generator function. For example, the second electric motor MG2 may be a rotary electric machine that does not have a generator function as long as having a motor function.

In the above-described embodiment, the electronic control device 50, the electric-motor control device 58 (configured to control the first and second electric motors MG1, MG2) and the engine control device 52 (configured to control the engine 12) are constituted by respective control devices that are separated from one another. However, the electronic control device 50, electric-motor control device 58 and engine control device 52 may be constituted by a single control device. In the present embodiment, the electronic control device 50, electric-motor control device 58 and engine control device 52 may be constituted by respective control devices that are functionally divided from one other, as needed.

It is to be understood that the embodiment described above is given for illustrative purpose only, and that the present invention may be embodied with various modifications and improvements which may occur to those skilled in the art.

NOMENCLATURE OF ELEMENTS

10: hybrid electric vehicle (electric vehicle)
14: pair of drive wheels
18: casing
18L: lower casing portion
18U: upper casing portion
30: transmission device
38: differential gear device (differential gear device)
42: drive shaft
54: electric-power control unit (electric-power control apparatus)
84: stator core (stator core)
84c: plurality of fastened portions
84y: yoke
90: accelerator pedal (pedal)
98: transaxle (drive apparatus)
CL1: first axis (axis of first electric motor)
CL2: second axis (axis of second electric motor)
CL3: third axis (axis of transmission device)
MG1: first electric motor
MG2: second electric motor
X: first fastened portion
Y: second fastened portion (another one of the plurality of fastened portions)
Z: third fastened portion (another one of the plurality of fastened portions)

What is claimed is:
1. An electric vehicle comprising:
a pair of drive wheels; and
a mechanical-electrical integrated unit constituted by a drive apparatus and an electric-power control apparatus that are housed in a same casing,
wherein the drive apparatus includes a first electric motor, a second electric motor and a transmission device configured to transmit a power outputted by the second electric motor toward the drive wheels,
wherein the electric-power control apparatus is configured to control an electric power transmitted and received by the first and second electric motors, wherein the casing has an upper casing portion and a lower casing portion that is disposed on a lower side of the upper casing portion in a vertical direction of the electric vehicle, wherein the electric-power control apparatus is housed in the upper casing portion while the drive apparatus is housed in the lower casing portion, wherein the first electric motor, the second electric motor and the transmission device have respective axes all of which are parallel to a width direction of the electric vehicle, such that the axis of the second electric motor, the axis of the transmission device and the axis of the first electric motor are arranged in this order from above to below in the vertical direction, and such that the axis of the first electric motor, the axis of the transmission device and the axis of the second electric motor are arranged in this order from front to rear in a longitudinal direction of the electric vehicle, and wherein the second electric motor includes a stator core that is provided with a plurality of fastened portions, such that a first fastened portion as one of the plurality of fastened portions is disposed in a position which overlaps the upper casing portion in the vertical direction and which is located on a front side of the axis of the second electric motor in the longitudinal direction, and such that another one of the plurality of fastened portions is disposed in a position which does not overlap the upper casing portion in a circumferential direction of the stator core.

2. The electric vehicle according to claim 1,
wherein the first fastened portion is disposed in the position which is not higher than an uppermost portion of a yoke of the stator core in the vertical direction and which is not more front than a frontmost portion of the yoke of the stator core in the longitudinal direction.

3. The electric vehicle according to claim 1, comprising:
a differential gear device to which the power is to be transmitted through the transmission device, and
a drive shaft connecting between the differential gear device and each of the drive wheels,
wherein a second fastened portion as the another one of the plurality of fastened portions is disposed in the position which is lower than the axis of the transmission device in the vertical direction and which is located on an outer peripheral side of the drive shaft.

4. The electric vehicle according to claim 3,
wherein a third fastened portion as still another one of the plurality of fastened portions is disposed in a position that does not overlap the axis of the second electric motor in the vertical direction.

5. The electric vehicle according to claim 3,
wherein a third fastened portion as still another one of the plurality of fastened portions is disposed in a position that is higher than a pedal of the electric vehicle in the vertical direction.

6. The electric vehicle according to claim 3,
wherein a third fastened portion as still another one of the plurality of fastened portions is disposed in a position which does not overlap the axis of the second electric motor in the vertical direction and which is higher than a pedal of the electric vehicle in the vertical direction.

7. The electric vehicle according to claim 6,
wherein the plurality of fastened portions consist of the first fastened portion, the second fastened portion and the third fastened portion, and
wherein the first fastened portion, the second fastened portion and the third fastened portion are arranged at equal angular intervals in the circumferential direction of the stator core.

8. The electric vehicle according to claim 1,
wherein the second electric motor is fastened at the plurality of fastened portions to the lower casing portion of the casing.

* * * * *